(12) United States Patent
Laumen et al.

(10) Patent No.: US 7,305,227 B2
(45) Date of Patent: *Dec. 4, 2007

(54) COST ACCOUNTING DURING DATA TRANSMISSION IN A MOBILE RADIOTELEPHONE NETWORK

(75) Inventors: Josef Laumen, Hildesheim (DE); Andreas Schmidt, Braunschweig (DE); Gunnar Schmidt, Wolfenbüttel (DE)

(73) Assignee: Siemens Aktiengesellschaft, Munich (DE)

( * ) Notice: Subject to any disclaimer, the term of this patent is extended or adjusted under 35 U.S.C. 154(b) by 245 days.

This patent is subject to a terminal disclaimer.

(21) Appl. No.: 10/381,543

(22) PCT Filed: Aug. 21, 2001

(86) PCT No.: PCT/DE01/03182

§ 371 (c)(1), (2), (4) Date: Mar. 24, 2003

(87) PCT Pub. No.: WO02/25922

PCT Pub. Date: Mar. 28, 2002

(65) Prior Publication Data

US 2004/0049438 A1  Mar. 11, 2004

(30) Foreign Application Priority Data

Sep. 22, 2000  (DE) ............................. 100 47 128
Oct. 9, 2000  (DE) ............................. 100 49 802
Jan. 9, 2001  (DE) ............................. 101 00 610
Feb. 13, 2001  (EP) ............................. 01103357

(51) Int. Cl.
*H04M 11/00*  (2006.01)

(52) U.S. Cl. ..................... 455/405; 455/406

(58) Field of Classification Search ................ 455/405, 455/406, 407, 408, 466
See application file for complete search history.

(56) References Cited

U.S. PATENT DOCUMENTS

| 5,822,310 | A | * | 10/1998 | Chennakeshu et al. ..... 370/317 |
| 5,930,343 | A | * | 7/1999 | Vasquez ................ 379/114.01 |
| 6,104,792 | A | | 8/2000 | Lautenschlager et al. |
| 6,473,622 | B1 | * | 10/2002 | Meuronen ................... 455/466 |
| 6,633,764 | B1 | * | 10/2003 | Garcia ........................ 455/466 |
| 6,701,378 | B1 | * | 3/2004 | Gilhuly et al. .............. 709/249 |

(Continued)

FOREIGN PATENT DOCUMENTS

CN  1166757  12/1997

(Continued)

OTHER PUBLICATIONS

Universal Mobile Telecommunications System (UMTS); Multimedia Messaging Service (MMS), Functional description; Stage 2 (3G TS 23.140 version 3.0.1 Release 1999(.

(Continued)

*Primary Examiner*—William J. Deane, Jr.
(74) *Attorney, Agent, or Firm*—Bell, Boyd & Lloyd LLP

(57) ABSTRACT

A method is provided for accounting of data transmission costs in a mobile radio network with respect to text and/or image data with and without sound, wherein data is assigned an identification signal for the transmission costs, and the identification signal is transmitted to a recipient of the data.

17 Claims, 17 Drawing Sheets

U.S. PATENT DOCUMENTS

| | | | |
|---|---|---|---|
| 6,738,634 B1 * | 5/2004 | Shin | 455/466 |
| 2001/0053687 A1 * | 12/2001 | Sivula | |
| 2002/0013854 A1 * | 1/2002 | Eggleston et al. | |
| 2004/0014456 A1 * | 1/2004 | Vaananen | |
| 2004/0121757 A1 | 6/2004 | Laumen et al. | |

FOREIGN PATENT DOCUMENTS

| | | |
|---|---|---|
| DE | 198 06 557 | 8/1999 |
| EP | 0753957 A2 | 1/1997 |
| EP | 0 803 848 A1 | 10/1997 |
| WO | WO9809451 | 3/1998 |
| WO | WO98/56202 | 12/1998 |
| WO | WO0041415 | 7/2000 |
| WO | WO 00/45609 | 8/2000 |
| WO | WO0225921 | 3/2002 |

OTHER PUBLICATIONS

GSM03 version 7.4.0 Release 1999 Digital Cellular Telecommunication System, Technical realization of the Short Message Services (SMS.

3G TS 23. 140 version 3.0.1 Release 1999 Third Generation Partnership Project Technical Specification Group Terminals, Multimedia Messaging Service (MMG) Functional Description Stage 2.

WAP 209 MMSE encapsulation, Release 2000, Wireless Application Protocol WAP Multimedia Messaging Service Message Encapsulation MMS Protocol SCD 1.0.

WAP 203 WSP, Version 4 May 2000, Wireless Application Protocol Wireless Session Protocol Specification, Chapter 8.4 Header Encoding.

* cited by examiner

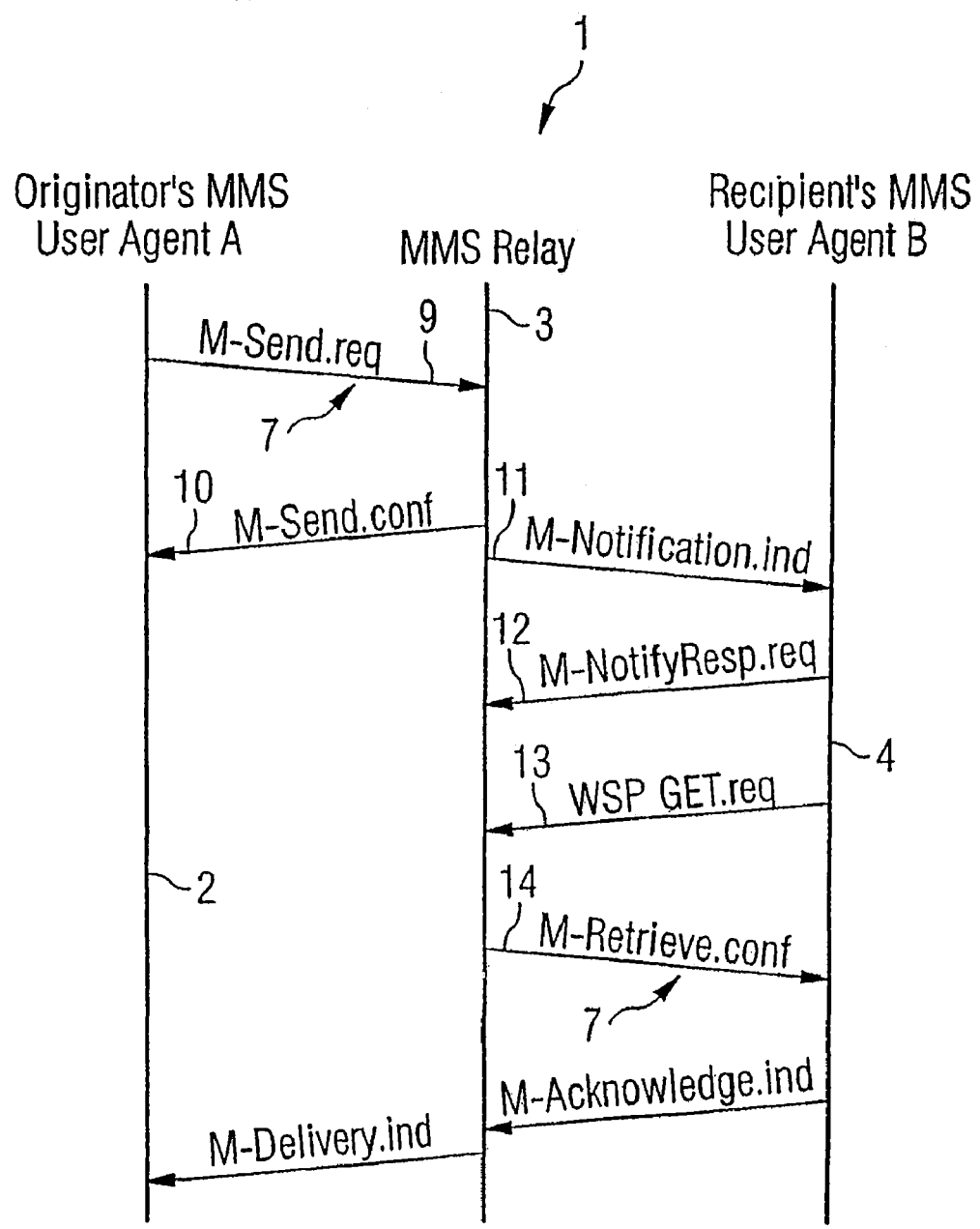

FIG 2A

| Name | Content | Comments |
|---|---|---|
| X-Mms-Mssage-Type | m-send-req | Mandatory. Indicates the transaction type. |
| X-Mms-Transaction ID | A unique code | Mandatory. This Transaction-ID identifies only M-Send.req and the corresponding reply. |
| X-Mms-Mms-Version | Version number | Mandatory. The MMS version number. The version is 1.0 in accordance with this specification. |
| Date | Send date | Optional. Arrival time of message at MMS server. The MMS server generates this field if it is not provided by the terminal. |
| From | Sender address | Mandatory. This field MUST be present in a message delivered to a recipient. This field CAN be generated by the sender client or CAN be inserted at the MMS server using the Insert-Address token. |
| To | Address #1 | Optional. Addressing is covered in chapter. Any number of address fields is permitted. |
| Cc | Address #1 | Optional. Addressing is covered in chapter 8. Any number of address fields is permitted, |
| Bcc | Address #1 | Optional. Addressing is covered in chapter. Any number of address fields is permitted. |
| Subject | Subject of the message | Optional |

FIG 2B

| Name | Content | Comments |
|---|---|---|
| X-Mms-Message-Class | Personal / advertising / information / auto | Optional. Auto shows a message which is automatically generated by the client. If the message class is auto, the source terminal MUST NOT request a delivery report or a read report. If the field is missing, the recipient interprets the message as personal. |
| X-Mms-Expiry | How long the message is stored on the server or when the message is deleted. | Optional. Default: maximum. The field has two formats: absolute or interval. |
| X-Mms-Delivery-Time | Requested delivery time | Optional. Default: immediate. Shows the earliest possible delivery of the messgae to the recipient. The field has two formats: absolute or interval. |
| X-Mms-Priority | Low / normal / high | Optional. Default: normal |
| X-Mms-Sender-Visibility | Hide / show | Optional. Default: show the sender's address/telephone number to the recipient if the sender's number/address is not confidential. Hide = do not show addresses. Show = show even confidential addresses. |

FIG 2C

| Name | Content | Comments |
|---|---|---|
| X-Mms-Delivery-Report | Yes / no | Optional. Default is specified if the service is requested. Indicates whether the user would like a delivery report from every recipient. If the message class is auto, the field MUST always be present and the value MUST be no. |
| X-Mms-Read-Reply | Yes/no | Optional. Indicates whether the user would like a read report from every recipient as a new message. If the message class is auto, the field MUST always be present and the value MUST be no. |
| Content-Type | Content-type code | Mandatory. The type of content of the message. |
| Content-Type | Content-type code | Mandatory. The type of content of the message. |

FIG 3A

| Name | Content | Comments |
|---|---|---|
| X-Mms-Message-Type | m-send-req | Mandatory. Indicates the transaction type. |
| X-Mms-Transaction-ID | A unique code | Mandatory. This Transaction-ID identifies only M-Send.req and the corresponding reply. |
| M-Mms-MMS-Version | Version number | Mandatory. The MMS version number. The version is 1.0 in accordance with this specification. |
| Date | Send date | Optional. Arrival time of message at MMS server. The MMS server generates this field if it is not provided by the terminal. |
| From | Sender address | Mandatory. This field MUST be present in a message delivered to a recipient. This field CAN be generated by the sender client or CAN be inserted at the MMS server using the insert-Address token. |
| To | Address #1 | Optional. Addressing is covered in chapter. Any number of address fields is permitted. |
| Cc | Address #1 | Optional. Addressing is covered in chapter 8. Any number of address fields is permitted. |
| Bcc | Address #1 | Optional. Addressing is covered in chapter. Any number of address fields is permitted. |
| Subject | Subject of message | Optional |

FIG 3B

| Name | Content | Comments |
|---|---|---|
| X-Mms-Message-Class | Personal/advertising/information/auto | Optional. Auto shows a message which is automatically generated by the client. If the message class is auto, the source terminal MUST NOT request a delivery report or a read report. If the field is missing, the recipient interprets the message as personal. |
| X-Mms-Reverse-Charging | ON/Off | Optional. |
| X-Mms-Expiry | How long the message is stored on the server or when the message is deleted. | Optional. Default; maximum. The field has two formats: absolute or interval. |
| X-Mms-Delivery-Time | Requested delivery time. | Optional. Default; immediate. Shows the earliest possible delivery of the message to the recipient. The field has two formats: absolute or interval. |
| X-Mms-Priority | Low/normal/high | Optional. Default; normal |

FIG 3C

| Name | Content | Comments |
|---|---|---|
| X-Mms-Sender-Visibility | Hide/show | Optional. Default; show the sender's address/telephone number to the recipient if the sender's number/address is not confidential. Hide = do not show addresses. Show = show even confidential addresses. |
| X-Mms-Delivery-Report | Yes/no | Optional. Default is specified if the service is requested. Indicates whether the user would like a delivery report from every recipient. If the message class is auto, the field MUST always be present and the value MUST be no. |
| X-Mms-Read-Reply | Yes/no | Optional. Indicates whether the user would like a read report from every recipient as a new message. If the message class is auto, the field MUST always be present and the value MUST be no. |
| Content - Type | Content - type code | Mandatory. The type of content of the message. |
| Content - Type | Content - type code | Mandatory. The type of content of the message. |

FIG 4

| Name | Content | Comments |
|---|---|---|
| X-Mms-Message-Type | m-send-conf | Mandatory. Indicates the transaction type. |
| X-Mms-Transaction-ID | A unique code | Mandatory. This Transaction-ID identifies only M-Send.conf and the corresponding reply. |
| X-Mms-Mms-Version | Version number | Mandatory. The MMS version number. The version is 1.0 in accordance with this specification. |
| X-Mms-Response-Status | Status code | Mandatory. MMS-specific status. |
| Message-ID | ID | Optional. This is a unique reference which is assigned to the message. This ID must always be present if the MMS server has accepted the message. As a result of the ID, a client can match delivery reports with previously sent messages. |

FIG 5

| Name | Content | Comments |
|---|---|---|
| X-Mms-Message-Type | m-send-conf | Mandatory. Indicates the transaction type. |
| X-Mms-Transaction-ID | A unique code | Mandatory. This Transaction-ID identifies only M-Send-conf and the corresponding request. |
| X-Mms-MMS-Version | Version number | Mandatory. The MMS version number. The version is 1.0 in accordance with this specification. |
| X-Mms-Reverse-Charging | On/Off | Optional. |
| X-Mms-Charging-Amount | Charge | Optional. |
| X-Mms-Response-Status | Status code | Optional. MMS-specific status. |
| Message-ID | ID | Optional. This is a unique reference which is assigned to the message. This ID MUST always be present if the MMS server has accepted the message. As a result of the ID, a client can compare delivery reports with previously sent messages. |

FIG 6

| Name | Content | Comments |
|---|---|---|
| X-Mms-Message-Type | m-notification-ind | Mandatory. Indicates the message type. |
| X-Mms-Transaction-ID | A unique code | Mandatory. Identifies the notification and the subsequent transaction which was inferred from the following M-NotifyResp. |
| X-Mms-MMS-Version | Version number | Mandatory. The MMS version number. The version is 1.0 in accordance with this specification. |
| From | Sender address | Optional. If hiding the address of the sender from the recipient is supported, the MMS server does not add this field to a message header. |
| X-Mms-Message-Class | Personal / advertising / information /auto | Mandatory. |
| X-Mms-Message-Size | Size of the message | Mandatory. Overall size of the message in bytes. |
| X-Mms-Expiry | How long the message will be available. | Mandatory. This field has only one format: interval. |
| X-Mms-Content-Location | URI | Mandatory. This field defines where the message is stored. |

FIG 7

| Name | Content | Comments |
|---|---|---|
| X-Mms-Message-Type | m-notification-ind | Mandatory. Indicates the transaction type. |
| X-Mms-Transaction-ID | A unique code | Mandatory. Identifies the notification and the subsequent transaction which was inferred from the following M-NotifyResp. |
| X-Mms-MMS-Version | Version number | Mandatory. The MMS version number. The version is 1.0 in accordance with this specification. |
| From | Sender address | Optional. If hiding the address of the sender from the recipient is supported, the MMS server does not add this field to a message header. |
| X-Mms-Reverse-Charging | On/Off | Optional. |
| X-Mms-Charging-Amount | Fee | Optional. |
| M-Mms-Message-Class | Personal / advertising / information / auto | Mandatory. |
| X-Mms-Message-Size | Size of the message | Mandatory. Overall size of the message in bytes. |
| X-Mms-Expiry | How long the message will be available. | Mandatory. This field has only one format: interval. |
| X-MS-Mms-Content-Location | URI | Mandatory. This field defines where the message is stored. |

FIG 8A

| Name | Content | Comments |
|---|---|---|
| X-Mms-Message-Type | m-retrieve-conf | Mandatory. Indicates the transaction type. |
| X-Mms-Transaction-ID | A unique code | Mandatory. Identifies either the transaction which was started by M-Notification without M-NotifyResp, or a new transaction if a deferred delivery was requested. The ID of the new transaction is optional. |
| Message-ID | ID | Optional. This is a unique reference which is assigned to the message. This ID MUST always be present if the original client has requested a read reply. As a result of the ID, a client can compare read reports with previously sent messages. |
| X-Mms-MMS-VErsion | Version number | Mandatory. The MMS version number. The version is 1.0 in accordance with this specification. |
| Date | Send date | Mandatory. |
| From | Sender address | Optional. If hiding the address of the sender from the recipient is supported, the MMS server does not add this field to a message header. |
| To | Address #1 | Optional. Addressing is covered in chapter. Any number of address fields is permitted. |

FIG 8B

| Name | Content | Comments |
|---|---|---|
| Cc | Address #1 | Optional. Addressing is covered in chapter. Any number of address fields is permitted. |
| Subject | Subject of the message | Optional. |
| X-Mms-Message-Class | Personal / advertising / information / auto | Optional. If the field is missing, the recipient interprets the message as personal. |
| X-Mms-Priority | Low / normal / high | Optional. Default: normal |
| X-Mms-Delivery-Report | Yes / no | Optional. Default: no. Indicates whether the user would like a delivery report from every recipient. |
| X-Mms-Reead-Reply | Yes / no | Optional. Default: no. Indicates whether the user would like a read report from every recipient as a new message. |
| Content-Type | Content-type code | Mandatory. The type of content of the message. |

FIG 9A

| Name | Content | Comments |
|---|---|---|
| X-Mms-Message-Type | m-retrieve-conf | Mandatory. Indicates the transaction type. |
| X-Mms-Transaction-ID | A unique code | Mandatory. Identifies either the transaction which was started by M-Notification without M-NotifyResp, or a new transaction if a deferred delivery was requested. The ID of the new transaction is optional. |
| Message-ID | ID | Optional. This is a unique reference which was assigned to the message. This ID MUST always be present if the original client has requested a read reply. As a result of the ID, a client can compare read reports with previously sent messages. |
| X-Mms-MMS-Version | Version number | Mandatory. The MMS version number. The version is 1.0 in accordance with this specification. |
| Date | Send date | Mandatory. |
| From | Sender address | Optional. If hiding the address of the sender from the recipient is supported, the MMS server does not add this field to a message header. |
| To | Address #1 | Optional. Addressing is covered in chapter. Any number of address fields is permitted. |
| Cc | Address #1 | Optional. Addressing is covered in chapter. Any number of address fields is permitted. |

FIG 9B

| Name | Content | Comments |
|---|---|---|
| Subject | Subjet of the message | Optional |
| X-Mms-Reverse-Charging | On / Off | Optional. |
| X-Mms-Charging-Amount | Fee | Optional. |
| X-Mms-Message-Class | Personal / advertising / information / auto | Optional. If the field is missing, the recipient interprets the message as personal. |
| X-Mms-Priority | Low / normal / high | Optional. Default normal |
| X-Mms-Delivery-Report | Yes / no | Optional. Default: no. Indicates whether the user would like a delivery report from every recipient. |
| X-Mms-Read-Reply | Yes / no | Optional. Default: no. Indicates whetherread report from every recipient as a new message. |
| Content-Type | Content-type code | Mandatory. The type of content of the message. |

FIG 10

| Name | Assigned Number |
| --- | --- |
| Bcc | 0x01 |
| Cc | 0x02 |
| X-Mms-Content-Location | 0x03 |
| Content-type | 0x04 |
| Date | 0x05 |
| X-Mms-Delivery-Report | 0x06 |
| X-Mms-Delivery-Time | 0x07 |
| X-Mms-Expiry | 0x08 |
| From | 0x09 |
| X-Mms-Message-Class | 0x0A |
| Message-ID | 0x0B |
| X-Mms-Message-Type | 0x0C |
| X-Mms-Version | 0x0D |
| X-Mms-Message-Size | 0x0E |
| X-Mms-Priority | 0x0F |
| X-Mms-Read-Reply | 0x10 |
| X-Mms-Report-Allowed | 0x11 |
| X-Mms-Response-Status | 0x12 |
| X-Mms-Sender-Visibility | 0x13 |
| X-Mms-Status | 0x14 |
| Subject | 0x15 |
| To | 0x16 |
| X-Mms-Transaction-Id | 0x17 |
| ... | ... |
| X-Mms-Reverse-Amount | 0x19 |
| X-Mms-Charging-Amount | 0x1A |

COST ACCOUNTING DURING DATA TRANSMISSION IN A MOBILE RADIOTELEPHONE NETWORK

BACKGROUND OF THE INVENTION

Existing mobile radio networks, such as the network which operates in accordance with the GSM standard, offer only limited possibilities for transmitting text data. For example, short messages having a maximum of 160 characters can be transmitted. This arrangement is designated SMS (Short Message Service). The data sender has to pay for the cost of sending such text messages.

A transmission of multimedia data, particularly still or moving images with or without sound, also will be possible in the future. A considerable increase in the data transmission volumes within such transmissions is expected, resulting in an increase in costs.

The present invention addresses the problem of simplifying the control of costs for subscribers to a mobile radio network.

SUMMARY OF THE INVENTION

Using the method in accordance with the present invention, it is possible to provide cost information to the data recipient or, alternatively, or additionally to the data sender, thereby facilitating cost control for the latter.

If the identification signal used therefor contains information on the person owing the costs, the recipient can then determine who is responsible for the costs of this data transmission.

If the identification signal contains information about the level of transmission costs, the transparency of the costs incurred is further improved.

It is particularly advantageous that the data sender can select whether the costs of a data transmission should be charged to him/her or to the recipient in whole or in part. The aforementioned information signal then allows the recipient to ascertain whether he/she has to bear the costs and what the costs are.

One embodiment of the present invention provides the possibility for the recipient of refusing the assumption of costs at least at the present moment and not to proceed with a transmission until a cheaper transmission time, or not to proceed with it at all.

All in all, therefore, a cost split can be undertaken by the sender depending on the type of data to be transmitted, wherein the recipient is informed of the type and level and, for his/her part, is able to decide whether he/she is in agreement with this.

Cost control and transparency are thereby significantly improved.

Additional features and advantages of the present invention are described in, and will be apparent from, the following Detailed Description of the Invention and the Figures.

BRIEF DESCRIPTION OF THE FIGURES

FIG. 1 shows a schematic diagram of messages, which are assigned to a data transmission in accordance with the WAP standard (wireless application protocol), between the level of the sender and that of the provider on one side and the level of the provider and that of the recipient on the other side.

FIG. 2 shows in figure sections 2A, 2B, 2C the M-send.req message in accordance with the WAP protocol.

FIG. 3 shows in figure sections 3A, 3B, 3C the M-send.req message with the addition of an identification signal in accordance with the present invention.

FIG. 4 shows the M-send.conf message in accordance with the WAP protocol.

FIG. 5 shows the M-send.conf message with the addition of an identification signal in accordance with the present invention.

FIG. 6 shows the M-Notification.ind message in accordance with the WAP protocol.

FIG. 7 shows the M-Notification.ind message with the addition of an identification signal in accordance with the present invention.

FIG. 8 shows in figure sections 8A, 8B the M-Retrieve.conf message in accordance with the WAP protocol.

FIG. 9 shows in figure sections 9A, 9B the M-Retrieve.conf message with the addition of an identification signal in accordance with the present invention.

FIG. 10 shows the setting of fields of the messages in accordance with the preceding figures.

DETAILED DESCRIPTION OF THE INVENTION

Figure 11:
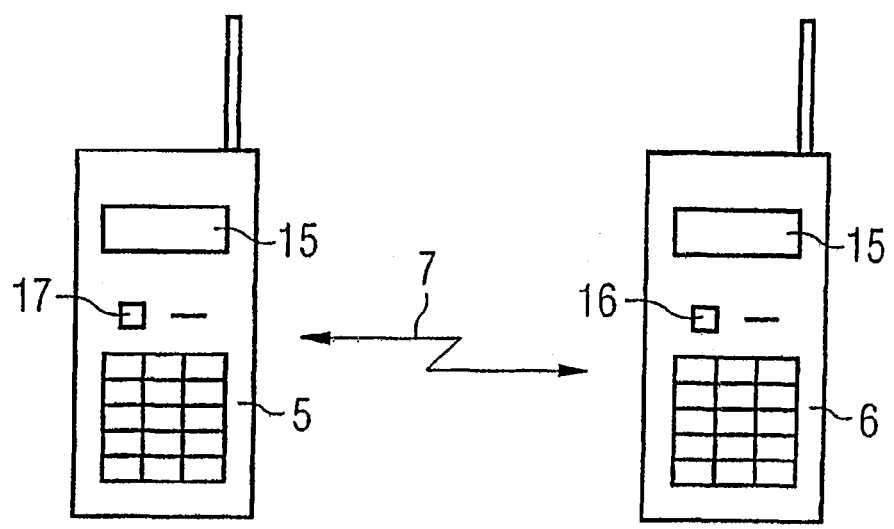
FIG. 11 shows a schematic representation of the data transmission using mobile telecommunication devices in accordance with the present invention.

In the exemplary embodiment, the application of the present invention is described in relation to a data transmission model 1 for the WAP standard, as it will be used in the transmission of, in particular, image data and formatted text data in the UMTS standard (Universal Mobile Telecommunication Standard). It is understood that the present invention also can be transferred to other standards.

In particular, in the UMTS standard, in addition to the existing SMS, provision is made to include a so-called MMS (Multimedia Messaging Service) for the transmission of messages. It is therefore possible also to transmit formatted texts and images. The restriction which exists in SMS to a message length of 160 characters does not apply. A transmission of audio and video messages is possible.

MMS can be implemented using WAP. In this case, for the radio transmission of data such as multimedia messages (MMs), the protocol model (WAP WSP: Wireless Session Protocol) is applied as shown in FIG. 1. This includes a level 2 of a data sender, a level 3 of a provider and a level 4 of a recipient. The level 2 of the data sender includes at least one telecommunication device 5, and the level 4 of the recipient likewise includes a telecommunication device 6. These telecommunication devices 5,6 can be designed as normal mobile phones, for example, or as devices with additional input or display functions, such as laptops.

A data record 7 which is written in the sender's telecommunication device 5, or which is to be relayed by the device, is initially sent as a message 9 (this message has the name M-Send.req in the WAP protocol) to the provider (level 3).

From there, the received message is acknowledged with the return message 10 (M-send.conf) to the sender (level 2).

Subsequently, the provider 3 sends the information 11 (M-Notification.ind) to the recipient (level 4), who is thus notified that a message for the recipient is available at the provider 3 for downloading.

In response to this, the provider 3 receives, perhaps automatically, the acknowledgment message 12 (M-Notify-Resp.req) from the telecommunication device 6 of the recipient (level 4).

Only at the request of the recipient using the message 13 (WSP GET.req) does the provider forward the data record 7 with the message 14 (M-retrieve.com) to the recipient.

The so-called header fields are used for managing the messages 9, 10, 11, 12, 14, and precede the actual data record 7, and contain information about the origin, send time, file size and other details.

In accordance with the present invention, the number of header fields is increased in order that at least one further field can be used as a cost information field and can contain an identification signal to indicate to the recipient and/or the sender the costs of the transmission.

In the exemplary embodiment, the field addressed with 0x19 in the hexadecimal system (equivalent to 25 in the decimal system) (FIG. 10) is provided for this in order to record the information about the selection of the recipient as the person owning the costs; the field 0x1A (26 in the decimal system) contains information about the level of costs.

The sender (level 2) can activate a switch 17 on the sender's telecommunication devices, the switch being hardware-based or, in particular, software-based and operated via the keyboard which is present in any case, in order to store the information "Reverse charging on" (i.e., assumption of costs by the recipient), or "Reverse charging off" (i.e., assumption of costs by the sender in the conventional manner), in field 0x19. For example, in the case of "Reverse charging on" the field 0x19 is assigned the value 128 and in the case of "Reverse charging off" the value 129. This field is set by the sender activating the switch and is sent with the message 9 (FIG. 3) to the provider (level 3). In place of a simple Yes/No selection a gradation also can be provided for in the "Reverse charging on/off" field, in order, for example, to split the cost half-and-half or in another proportion between sender and recipient.

In his/her acknowledgment message 10 (FIG. 5), the provider confirms his/her readiness to accept the assumption of costs by the recipient and then sets the field 0x19 in the message 10 (M-send.conf) to the sender to "Reverse charging on", or in the event of rejection to "Reverse charging off". The sender receives the corresponding message to the effect that his/her wish to transfer costs has been accepted or rejected. Moreover the message 10 contains in field 0x1A, for example as a string file, information on the level of costs, prepared by the service provider (level 3). This information can be communicated to the sender regardless of whether the latter wishes to accept the costs himself/herself or to charge them to the recipient, which improves cost transparency. It is also possible to send this information back to the sender only if the latter has selected the "reverse charging off" mode.

If agreeable to the desired assumption of costs by the recipient, the provider in his/her message 11 M-notification-.ind (FIG. 7) to the recipient leaves the field 0x19 at "Reverse charging on". The recipient then receives the message that a chargeable data record 7 is ready for him/her to download. Moreover the message 11 contains in field 0x1A, for example as a string file, information on the level of costs, prepared by the provider (level 3). This information can be communicated to the recipient visually (via the indicator 15, for example, the display) or acoustically, regardless of whether the latter at the wish of the sender should or should not assume the costs, which improves cost transparency. It is also possible to forward this information to the recipient only if the "reverse charging on" mode was selected.

The recipient can now decide whether he/she wishes to download the chargeable data record 7 from the provider's level 3 to his/her reception level 4, in other words to the memory of his telecommunication device 6. To this end, he/she has available, in a similar manner as described above for the sender, a hardware-based or software-based switch 16, which the recipient can activate to decide whether or not he/she wishes to receive the data record 7, if appropriate assuming the costs himself/herself. If the sender decides to do this, he/she will send the message 13 (WSP GET.req) back to the provider. At the provider's end, the data transmission 14 (M-Retrieve.conf) to the recipient is thereby initiated. Otherwise, downloading of the data record 7 (transmission of the message 14 to the recipient) is not released. It is also possible that the recipient does not wish to have the message transmitted until a later, cheaper time. The message 14 also contains the two fields 0x19 and 0x1A for acceptance of the identification signal (FIG. 9). The cost information is, thus, not only supplied in the event of notification about a message which is ready, but also when the data record 7 is "delivered". Thus, it also can be stored or, for instance, printed out.

In accordance with the present invention, for example, a child can send messages to his/her parents, without the child having to pay for them. This is of particular importance if the communication must be paid for directly, via cards for example, the value of which is decreased. Thus, it is still possible to transmit data 7 using the reversed-charge method when cards have too little remaining value.

Thanks to the information on costs, cost transparency is improved regardless of the person selected who owes the costs. The recipient also can notify the sender of costs afterwards which would have been avoidable, such as roaming costs in the case of messages from abroad, or the provider's charges for storage, perhaps because the recipient has not switched his/her telecommunication device 6 on for a long time. Both can then look for opportunities for savings.

The proposed method can be integrated in software for operating the communication standard in each case; for example, UMTS. The telecommunication devices 5,6 are then provided with corresponding software.

An MMS relay is also part of the present invention, and generates a cost identification signal as an element of a telecommunication system to enable data transmission via a mobile radio network. Advantageously, it forwards this signal to the recipient. Moreover, the MMS relay advantageously checks the admissibility of a wish by the sender for the costs to be assumed by the recipient and can reject or accept this wish. It can send the recipient a message about this. Advantageously, the MMS relay can determine the level of costs for sending the data record and send it to the sender.

In addition, the costs for receiving the data record are preferably determined by the MMS relay and the level of costs incurred is forwarded to the recipient, the forwarding taking place in the notification to the recipient (MMS user agent, level 4) by the MMS relay of the service provider (level 3) about the presence of a new data record (multimedia message) and/or in the event of a data record (multimedia message) being transmitted by the MMS relay of the service provider (level 3) to the recipient (MMS user agent, level 4).

Although the present invention has been described with reference to specific embodiments, those of skill in the art will recognize that changes may be made thereto without departing from the spirit and scope of the present invention as set forth in the hereafter appended claims.

The invention claimed is:

1. A method for accounting of data transmission costs in a mobile radio network with respect to multimedia message, comprising the steps of:

assigning a cost identification signal to the data of the multimedia message, being transmitted by a sender's telecommunication device, selecting whether the cost of the data transmission of the multimedia message to be sent should be charged to the sender's telecommunication device or to a recipient's telecommunication device whole or in part based on a gradation for cost splitting between the sender and the recipient;

transmitting the multimedia message via a MMS relay of a service provider to a recipient's telecommunication device after the cost identification signal has been assigned; and sending a notification signal to the recipient's telecommunication device via the MMS relay of the service provider, notifying that the data of the multimedia message is available at the MMS relay of the provider for downloading, and wherein the assigned cost identification signal is transmitted during transmission of the notification signal from the MMS relay of the service provider to the recipient's telecommunication device informing the recipient about the selection of the sender who bears the costs for downloading the data of the multimedia message being available at the MMS relay of the service provider.

2. A method for accounting of data transmission costs in a mobile radio network as claimed in claim 1, wherein the identification signal contains information about a level of the transmission costs.

3. A method for accounting of data transmission costs in a mobile radio network as claimed in claim 1, wherein existing transmission costs are assigned to the data by a provider before the data is forwarded to the recipient and the information about this is sent to the recipient.

4. A method for accounting of data transmission costs in a mobile radio network as claimed in claim 1, wherein the transmission costs are indicated to the recipient before receipt of the data.

5. A method for accounting of data transmission costs in a mobile radio network as claimed in claim 4, wherein the transmission costs are indicated to the recipient in a manner which is one of visual and acoustic.

6. A method for accounting of data transmission costs in a mobile radio network as claimed in claim 1, wherein a telecommunication device of the recipient features an assumption switch to confirm an assumption of costs, and the transmission to the recipient is not enabled until the acceptance switch has been triggered.

7. A method for accounting of data transmission costs in a mobile radio network as claimed in claim 1, wherein the method is applied in a transmission standard which is at least one of UMTS, GSM, GPRS and EDGE.

8. A method for accounting of data transmission costs in a mobile radio network as claimed in claim 1, wherein the identification signal is assigned to at least one header field of the data which is transmitted.

9. A method for accounting of data transmission costs in a mobile radio network as claimed in claim 1, wherein a selection of a person owing the costs is stored in a header field and a level of the transmission costs is stored in a further header field.

10. A method for accounting of data transmission costs in a mobile radio network as claimed in claim 9, wherein the selection of the person bearing the cost is stored in a header field 0x19 and the level of the transmission costs is stored in a header field 0x1A.

11. A method for accounting of data transmission costs in a mobile radio network as claimed in claim 9, wherein the identification signal for the level of transmission costs is transmitted respectively in the notification to the recipient by the MMS relay of the service provider concerning the presence of a new multimedia data record, as well as during transmission of a multimedia data record from the MMS relay of the service provider to the recipient.

12. A method for accounting of data transmission costs in a mobile radio network as claimed in claim 9, wherein the additional header field for the selection of the person owing the costs is assigned respectively to messages M-send.req, M-send.conf, M-Notification.ind and M-Retrieve.conf and the additional header field for the level of the transmission costs is assigned respectively only to the messages M-Notification.ind and M-Retrieve.conf.

13. A method for accounting of data transmission costs in a mobile radio network as claimed in claim 12, wherein the outgoing message M-send.req is assigned an additional header field for selection by the sender of the person owing the costs.

14. A method for accounting of data transmission costs in a mobile radio network as claimed in claim 12, wherein, in the message M-send.conf returned to the data sender by a provider the same header field acknowledges with a confirmation of one of acceptance and rejection of a selection of the person owing the costs.

15. A method for accounting of data transmission costs in a mobile radio network as claimed in claim 12, wherein, in the message M-Notification.ind sent to the recipient by the provider, the same header field is populated with a signal which indicates the selection of the person owing the costs.

16. A method for accounting of data transmission costs in a mobile radio network as claimed in claim 9, wherein a message WSP Get.req sent to the provider by the recipient represents a signal accepting the selection of the person owing the costs.

17. An apparatus for accounting of data transmission costs in a mobile radio network with respect to multimedia message, comprising:

means for assigning a cost identification signal to the data of the multimedia message, being transmitted by a sender's telecommunication device, selecting whether the cost of the data transmission of the multimedia message to be sent should be charged to the sender's telecommunication device or to a recipient's telecommunication device whole or in part based on a gradation for cost splitting between the sender and the recipient;

means for transmitting the multimedia message via a MMS relay of a service provider to a recipient's telecommunication device after the cost identification signal has been assigned; and means for sending a notification signal to the recipient's telecommunication device via the MMS relay of the service provider, notifying that the data of the multimedia message is available at the MMS relay of the provider for downloading, and wherein the assigned cost identification signal is transmitted during transmission of the notification signal from the MMS relay of the service provider to the recipient's telecommunication device informing the recipient about the selection of the sender who bears the costs for downloading the data of the multimedia message being available at the MMS relay of the service provider.

* * * * *